(12) United States Patent
Bredemeyer et al.

(10) Patent No.: US 11,274,169 B2
(45) Date of Patent: Mar. 15, 2022

(54) SYNTHETIC RESIN COMPOSITION AND METHOD FOR HYBRID MANUFACTURING

(71) Applicant: Collider, Inc., Chattanooga, TN (US)

(72) Inventors: Graham Bredemeyer, Chattanooga, TN (US); Cody Flowers, Chattanooga, TN (US)

(73) Assignee: Collider, Inc., Chattanooga, TN (US)

( * ) Notice: Subject to any disclaimer, the term of this patent is extended or adjusted under 35 U.S.C. 154(b) by 170 days.

(21) Appl. No.: 15/979,317

(22) Filed: May 14, 2018

(65) Prior Publication Data

US 2018/0327527 A1 Nov. 15, 2018

Related U.S. Application Data

(60) Provisional application No. 62/505,935, filed on May 14, 2017, provisional application No. 62/505,933, filed on May 14, 2017.

(51) Int. Cl.
| | | |
|---|---|---|
| *C08F 120/58* | (2006.01) | |
| *B29C 33/38* | (2006.01) | |
| *B29C 33/40* | (2006.01) | |
| *B29C 45/40* | (2006.01) | |
| *B33Y 10/00* | (2015.01) | |
| *B33Y 70/00* | (2020.01) | |
| *B29C 64/124* | (2017.01) | |
| *B29C 33/52* | (2006.01) | |
| *B29C 39/34* | (2006.01) | |
| *B29C 64/106* | (2017.01) | |
| *B33Y 30/00* | (2015.01) | |
| *B33Y 80/00* | (2015.01) | |

(52) U.S. Cl.
CPC ........ *C08F 120/58* (2013.01); *B29C 33/3842* (2013.01); *B29C 33/40* (2013.01); *B29C 33/52* (2013.01); *B29C 39/34* (2013.01); *B29C 45/40* (2013.01); *B29C 64/106* (2017.08); *B29C 64/124* (2017.08); *B33Y 10/00* (2014.12); *B33Y 30/00* (2014.12); *B33Y 70/00* (2014.12); *B33Y 80/00* (2014.12)

(58) Field of Classification Search
CPC ........ C08F 120/58; B33Y 10/00; B33Y 70/00
See application file for complete search history.

(56) References Cited

U.S. PATENT DOCUMENTS

| | | | | |
|---|---|---|---|---|
| 2014/0093709 A1* | 4/2014 | Toyoda | ................ | C08K 5/3435 428/208 |
| 2015/0125702 A1* | 5/2015 | He | ............................ | C08F 2/50 428/413 |

* cited by examiner

*Primary Examiner* — Nathan T Leong
(74) *Attorney, Agent, or Firm* — Run 8 Patent Group, LLC; Peter Miller; Alexander R. Flake

(57) ABSTRACT

A liquid resin composition comprising: a first proportion of acryloyl morpholine monomers; a second proportion of a photoinitiator exhibiting photodissociation into reactive subspecies responsive to selective exposure to radiation within a spectrum, the reactive subspecies polymerizing the first proportion of acryloyl morpholine; a third proportion of a radiation blocker absorbing radiation within the spectrum to limit penetration depth of incident radiation within the spectrum in the liquid resin; a fourth proportion of a polymerization inhibitor limiting an average chain length of acryloyl morpholine polymer polymerized from the first proportion of acryloyl morpholine monomers; and a fifth proportion of a temperature-stabilizer increasing the heat-deflection temperature of acryloyl morpholine polymer polymerized from the first proportion of acryloyl morpholine monomers.

8 Claims, 5 Drawing Sheets

SYNTHETIC RESIN COMPOSITION AND METHOD FOR HYBRID MANUFACTURING

CROSS-REFERENCES TO RELATED APPLICATIONS/PATENTS

This application claims the benefit of U.S. Provisional Application No. 62/505,933, filed on 14 May 2017, and U.S. Provisional Application No. 62/505,935, filed on 14 May 2017.

This Application is related to U.S. patent application Ser. No. 15/173,158, filed on 3 Jun. 2016, which claims the benefit of U.S. Provisional Application No. 62/171,690, filed on 5 Jun. 2015, and U.S. Provisional Application No. 62/305,144, filed on 8 Jun. 2016, all of which are incorporated in their entireties by this reference.

FIELD OF THE INVENTION

The present invention relates generally to compositions and methods for manufacturing, and particularly to compositions and methods for casting and additive manufacturing.

DESCRIPTION OF THE EMBODIMENTS OF THE INVENTION

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Composition and Product

Figure 1:
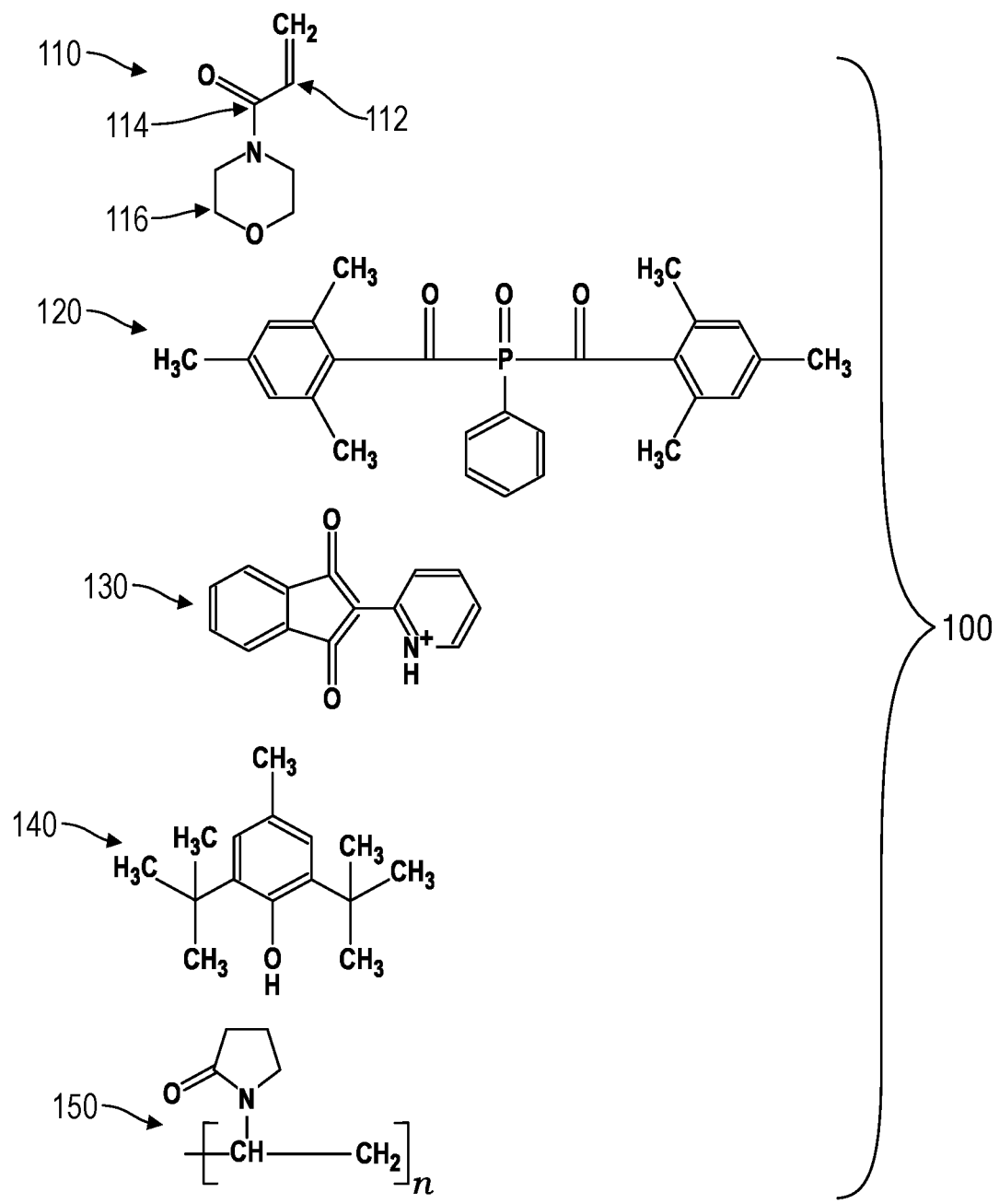
FIG. 1 is a schematic representation of one variation of the composition.

As shown in FIG. 1, a liquid resin composition 100 includes: a first proportion of acryloyl morpholine monomers 110; a second proportion of a photoinitiator 120 exhibiting photodissociation into reactive subspecies responsive to selective exposure to radiation within a spectrum, the reactive subspecies polymerizing the first proportion of acryloyl morpholine 110; a third proportion of a radiation blocker 130 absorbing radiation within the spectrum to limit the penetration depth of incident radiation within the spectrum; a fourth proportion of a polymerization inhibitor 140 limiting an average chain length of acryloyl morpholine polymer 118 polymerized from the first proportion of acryloyl morpholine monomers 110; and a fifth proportion of a temperature-stabilizer 150 increasing the heat-deflection temperature of acryloyl morpholine polymer 118 polymerized from the first proportion of acryloyl morpholine monomers 110.

In one variation, the liquid resin composition 100 forms a synthetic resin product and includes, in a liquid phase: a mixture of acryloyl morpholine in monomer form 110; a temperature stabilizer 150; a photoinitiator 120 exhibiting photodissociation into reactive subspecies responsive to incident radiation within a spectrum; a radiation blocker 130 absorbing radiation within the spectrum; and a polymerization inhibitor 140. In a rigid water-soluble phase, the synthetic resin product includes acryloyl morpholine polymer chains 118: polymerized from the acryloyl morpholine 110 in monomer form responsive to reactive subspecies produced by photodissociation of the photoinitiator 120; and characterized by an average chain length limited by the polymerization inhibitor 140; the temperature stabilizer 150 increasing a heat-deflection temperature of the rigid water-soluble phase.

1.1 Composition and Product: Applications

Generally, the liquid resin composition 100 contains: a photoinitiator 120 that dissociates into reactive subspecies in the presence of electromagnetic radiation; and a monomer that polymerizes with high volumetric selectivity in the presence of these reactive subspecies to form a water-soluble rigid structure. For example, the liquid resin composition 100 can be selectively exposed to electromagnetic radiation to selectively polymerize the monomer to form a shell defining an internal volume of a part, wherein the shell: exhibits mechanical properties sufficient to resist deformation during injection of an injection material under pressure into the internal volume, such as during exothermic hardening of the injection material within the internal volume; and dissolves in the presence of water to expose the injection material, now in the form of a solid part.

In particular, the liquid resin composition 100 is a photocurable liquid resin, where, upon being exposed to UV, near-UV, or other types of electromagnetic radiation, the composition cures into a rigid, temperature stable, and water-soluble solid resin composition 101. The liquid resin composition 100 is a mixture including acryloyl morpholine monomers 110, a photoinitiator 120, a radiation blocker 130, a polymerization inhibitor 140, and a temperature stabilizer 150. The photoinitiator 120 can include any molecule that dissociates into reactive subspecies that cause the acryloyl morpholine to polymerize upon exposure to a spectrum of electromagnetic radiation. The radiation blocker 130 limits the penetration of electromagnetic radiation in the liquid resin. Limiting penetration allows more selective photocuring for applications such as additive manufacturing.

The polymerization inhibitor 140 limits the average chain length of the acryloyl morpholine when photocuring of the liquid resin occurs. The specific concentration of the polymerization inhibitor 140, therefore, may change the material properties of the resulting photocured solid resin composition 101. The temperature stabilizer 150 is typically a second polymer or other molecule that provides additional temperature stability to the solid resin composition 101. In one variation of the liquid resin composition 100, the polyvinylpyrrolidone increases the heat deflection temperature and overall rigidity of the solid resin composition 101 formed predominantly (e.g., greater than 85% by mass) of polymerized acryloyl morpholine 118.

A synthetic resin product, produced through photocuring of the liquid resin composition 100, exhibits properties including high tensile yield strength and rigidity, high heat-deflection temperature, solubility in water, and non-toxicity when in contact with human skin, especially when compared with other photocurable resins. For these reasons, the synthetic resin product can be used in applications where these traits are beneficial.

The properties of the synthetic resin product are derived from the chemical species of the liquid resin composition 100 after the photocuring process. In particular, the temperature stabilizer 150 can increase the heat-deflection temperature and rigidity of the synthetic resin product by creating chemical or physical crosslinks between the temperature stabilizer 150 and the acryloyl morpholine polymer 118 that results from photocuring of the liquid resin composition 100, or by increasing van der Waals forces between the molecules present in the synthetic resin product. Despite the inclusion of the temperature stabilizer in the liquid resin composition 100, the synthetic resin product maintains water-solubility due to the structural dissociative properties of the acryloyl morpholine polymer 118 in addition to the inherent properties of the temperature stabilizer 150.

For example, the photoinitiator 120 can include bis(2,4, 6-trimethylbenzoyl)-phenylphosphineoxide, the polymerization inhibitor 140 can include butylated hydroxytoluene, and the temperature stabilizer 150 can include polyvinylpyrrolidone. In this example, the first proportion of acryloyl morpholine 110 is between 77.22% and 97.84% of the liquid resin composition 100, the second proportion of the photoinitiator can range from 0.1% to 5.0% of the mass of the photocurable monomer, the third proportion of the radiation blocker 130 can range from 0.005% to 1.5% of the mass of the photocurable monomer, the fourth proportion of the polymerization inhibitor 140 can range from 0.1% to 3.0% of the mass of the photocurable monomer, and the fifth proportion of the temperature stabilizer 150 can range from 2.0% to 20.0% of the mass of the photocurable monomer.

Unless otherwise indicated, proportions are given herein as mass proportions of the mass of the photocurable monomer (e.g. acryloyl morpholine), unless the proportion is of the photocurable monomer itself, in which case the proportion is of the total mass of the liquid resin composition 100. Furthermore, the composition and product are described herein in the context of applications in additive manufacturing to create single-use water soluble molds. However, the composition can be applied in other scenarios, such as to form water-soluble support structures in additive manufacturing, etc.

1.2 Terms

The phrase "liquid resin composition" refers to the chemical composition of the resin before photocuring has occurred in the resin. The phrase "liquid resin composition" refers to the resin in liquid form in which the monomer is not yet polymerized in a photocuring process. As described above, the liquid resin composition 100 can be photocured into a "synthetic resin product."

The phrase "synthetic resin product" refers to any product created via selective photocuring of the liquid resin composition 100. The rigid, photocured state of the liquid resin composition 100, which forms the synthetic resin product is hereinafter referred to as the "solid resin composition."

That the resin composition is referred to as either "liquid" or "solid" does not imply that a traditional physical phase change occurs between the "liquid" and "solid" states of the resin composition, nor does it imply that the compositions are traditional solids or liquids. Rather, a chemical change occurs upon photocuring of the liquid resin composition 100, transforming the liquid resin composition 100 into a rigid plastic. Thus, the chemical species present in the solid resin composition 101 necessarily differ from those present in the liquid resin composition 100. However, the chemical species present in the solid resin composition 101 (and forming a synthetic resin product) are entirely derivative of the chemical species of the liquid resin composition 100 with the exception of chemical species partially derived from environmental species (such as those found in the air). Furthermore, the specific proportions of the chemical species in the solid resin composition 101 may vary based on the photocuring process that caused the physical change. Therefore, for ease of explanation, byproducts and chemical recombinations of those byproducts that are present in the solid resin composition 101, may not be specifically discussed in this description. Furthermore, the liquid resin composition 100 and the solid resin composition 101 can include functionally equivalent chemical species to those shown in the figures (e.g. alternative chain forms of the polymer and alternative reactive subspecies).

1.2 Composition and Product: Examples

In a hybrid manufacturing application, the liquid resin composition 100 may be formed into a shell using additive manufacturing techniques. In this case, the liquid resin composition 100 can be dispensed into a fabrication chamber where it can be selectively exposed to electromagnetic radiation to produce a shell. The shell can define an internal volume of a part and may be used in a molding or curing process. During a molding process, the shell can be pressurized and injected with an injection material. Once the injection material has hardened, the shell composed of the solid resin composition 101 can be dissolved in water to reveal the hardened part.

The solid resin composition 101 is particularly suited to this application, as the shell can be exposed to high temperatures of two hundred to three hundred degrees Fahrenheit and pressures of greater than sixty pounds per square inch, during the molding or casting process. Additionally, while functioning as a mold, the solid resin composition 101 should maintain its intended form in order to accurately produce a part. Traditional resins used in additive manufacturing do not exhibit the required temperature stability for use in this process, while also exhibiting water solubility. Because of the water solubility of the synthetic resin product, a shell of the synthetic resin product can be easily removed from the finished part without the application of mechanical force or through a specialized design of the shell.

Furthermore, the solid resin composition 101 can be used as a support material for an additive manufacturing process. Typically, support material provides additional structural integrity to a part undergoing additive manufacturing. Upon completion of the additive manufacturing process, typical support material may be dissolved in a chemical bath and/or mechanically removed from the finished part. A typical support material removal process is time consuming, risks damage to the part during mechanical removal of the support material, and could potentially harm a user if she unintentionally exposes her skin or eyes to the chemical bath. In contrast, the solid resin composition 101 provides the needed support during the build process, and dissolves easily in a water bath without the use of more aggressive (e.g. toxic) chemical solvents or significant mechanical force.

1.3 Photocurable Monomer

The liquid resin composition 100 includes the photocurable monomer, such as acryloyl morpholine 110 (i.e. $C_7H_{11}NO_2$, as illustrated in FIG. 1). In typical resin compositions, acryloyl morpholine 110 is combined with co-monomers and used as a component of hydrogels for biomedical applications. Through the use of the temperature stabilizer 150 and selection of the proportion of polymerization inhibitor 140 in the liquid resin composition 100, acryloyl morpholine polymers 118 can exhibit increased rigidity, while still maintaining its favorable traits such as solubility in water and adhesion to metal. The liquid resin composition 100 can alternatively include other monomers exhibiting similar properties. For example, other acryloyl group monomers can be included since they may be polymerized through free radical polymerization with a free radical that cleaves the carbon-carbon double bond 112 in the acryloyl group. Additionally, the acryloyl group typically exhibits solubility in water due to the polarity of the carbonyl group 114. Additionally, the morpholine functional group 116 in acryloyl morpholine 110 is miscible in water, further improving solubility of poly acryloyl morpholine. Thus, other possible photocurable acryloyl monomers can include miscible or soluble functional groups.

Because acryloyl morpholine 110 is the primary photocurable monomer included in the liquid resin composition 100, it can be included in relatively large proportions in comparison with other chemical species of the liquid resin composition 100. For example, the liquid resin composition 100 can include between 77.22% and 97.84% acryloyl morpholine 110 by mass. However, the photocurable monomer can include any other monomer that polymerizes in the presence of a photoacid or other subspecies of a dissociated photoinitiator 120.

1.4 Photoinitiator

The liquid resin composition 100 includes the second proportion of the photoinitiator 120, which exhibits photodissociation into reactive subspecies responsive to selective exposure to radiation within a spectrum, and wherein the reactive subspecies polymerizes the first proportion of acryloyl morpholine no. Note that FIG. 1 illustrates one example of a photoinitiator 120, however the liquid resin composition 100 may include alternative photoinitiators 120. Generally, the liquid resin composition 100 includes a photoinitiator 120 that dissociates into reactive subspecies (i.e. free radicals), upon exposure to electromagnetic radiation, to cause polymerization of the acryloyl morpholine monomers no or other monomers in the liquid resin. In particular, the photoinitiator 120 can selectively dissociate into reactive subspecies responsive to incident electromagnetic radiation within the spectrum to selectively polymerize subvolumes of the first proportion of acryloyl morpholine monomers no, wherein the reactive subspecies attack the carbon-carbon double bond 112 of acryloyl morpholine no.

The liquid resin composition 100 can include photoinitiators 120 that absorb in the UV or near-UV range, since such photoinitiators may be less likely to breakdown upon exposure to ambient light. Specifically, liquid resin compositions 100 including a photoinitiator 120 with an absorption spectrum in the 350-450 nanometer wavelength range can be selectively photocured by UV LEDs or near-UV LEDs typically utilized in additive manufacturing applications. Some variations of the liquid resin composition 100 include, a photoinitiator 120 with a peak absorption at approximately 405 nanometers.

Figure 2:
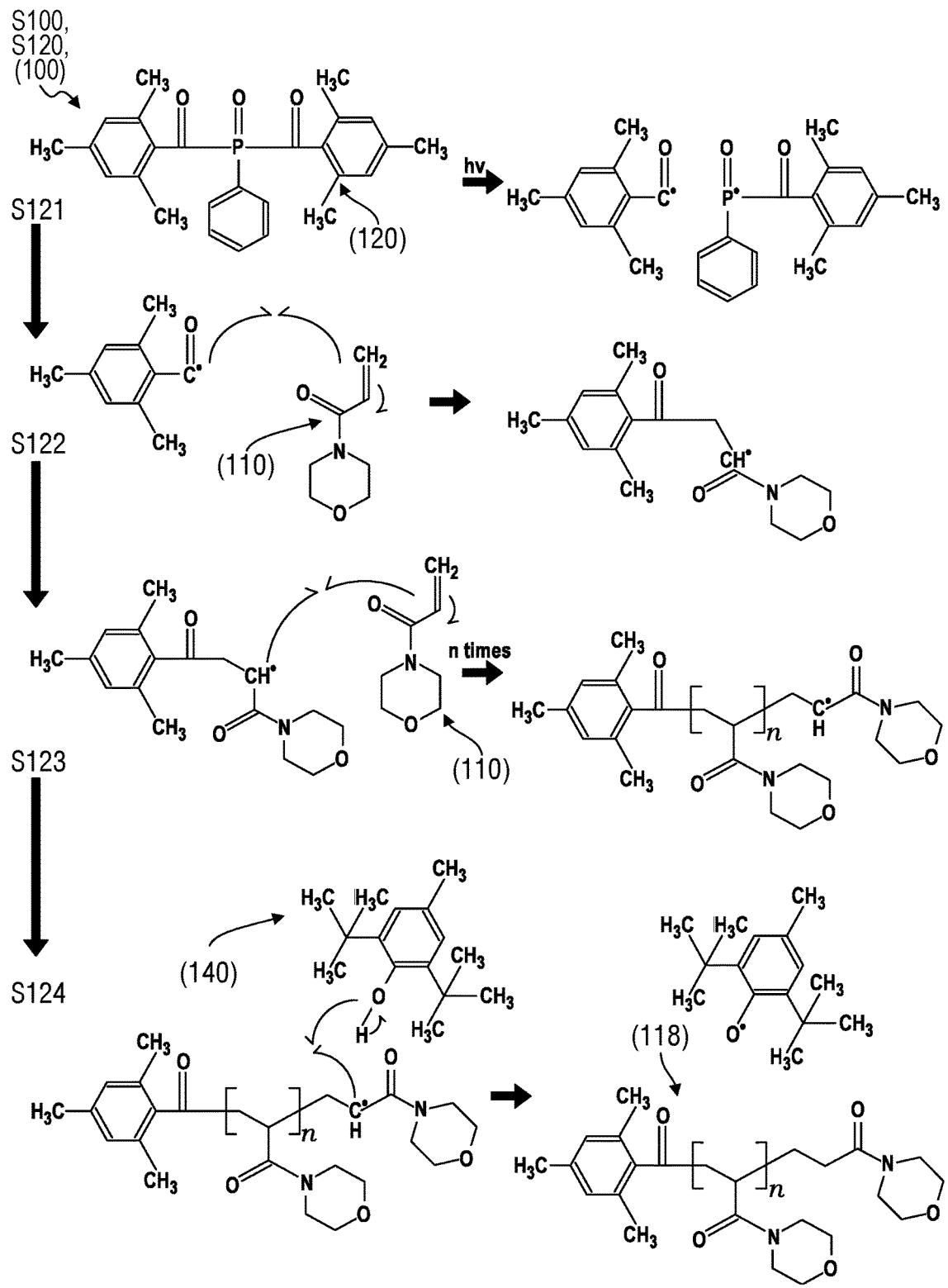
FIG. 2 is a schematic representation of a method and one variation of the composition.

In one variation of the liquid resin composition 100, bis(2,4,6-trimethylbenzoyl)-phenylphosphineoxide (hereinafter "BTP") is included in the liquid resin as the photoinitiator 120 (shown, for example, in FIG. 1). BTP exhibits significant absorption of light at 405 nanometers, dissociating into reactive subspecies via the disassociation reaction of Block S121 shown in FIG. 2. The reactive subspecies then polymerize acryloyl morpholine no via the catalyzing reaction of Block S122, which subsequently causes the polymerization reaction of Block S123. BTP is additionally suited for applications where the synthetic resin product is dissolved in water because the solid resin composition 101 is non-reactive when introduced to water and non-toxic upon contact with human skin.

In one variation, the liquid resin composition 100 includes a co-initiator, which may refine the kinetic properties of the photoinitiation reaction. For example, 1-Hydroxycyclohexyl-1-phenylketone can be included in the liquid resin composition 100 to co-initiate with BTP.

In one implementation, the solid resin composition includes between 0.1. and 1.0% of the photoinitiator 120. For example, a greater proportion of the photoinitiator 120 generally increases the number of chains in the solid resin composition 101 with the acryloyl morpholine polymer chains 118 having a shorter average chain length. Conversely, a smaller proportion of photoinitiator 120 results in a longer average chain length with correspondingly fewer acryloyl morpholine polymer chains 118.

1.5 Radiation Blocker

The liquid resin composition 100 includes a radiation blocker 130 to limit the penetration depth of photoinitiating radiation in the liquid resin composition 100. This allows for more selective exposure to the photoinitiating radiation within a volume of the liquid resin composition 100. For example, in additive manufacturing applications, the penetration depth of photoinitiating radiation may correspond to the layer thickness. As such, the resolution of the manufactured product will be improved if the layer thickness is reduced through the introduction of a radiation blocker 130. Thus, the absorption spectrum of the radiation blocker 130 can be matched as closely as possible with the absorption spectrum of the photoinitiator 120.

In one variation, the liquid resin composition 100 includes BTP, which exhibits a peak absorption at approximately 405 nanometers. In this variation, radiation blockers 130 such as alpha-pyrophthalone (illustrated, for example, in FIG. 1) or species of the benzotriazole class of compounds can be included in the liquid resin composition 100. To maintain the low toxicity of the solid resin composition 101, it is also important that the radiation blockers 130 used are non-toxic upon exposure to human skin.

In one variation of the liquid resin composition 100, the radiation blocker 130 absorbs radiation within a spectrum with a wavelength between 405 nanometers and 450 nanometers; and is included in the liquid resin composition 100 in a proportion that limits the penetration depth of incident radiation within the spectrum to less than 0.15 millimeters in a volume of the liquid resin composition 100. The liquid resin composition 100 can include a proportion of between 0.005% to 1.5% of the radiation blocker 130 to achieve a penetration depth of less than 0.15 millimeters.

1.6 Polymerization Inhibitor

The liquid resin composition 100 includes a polymerization inhibitor 140, which functions to limit the average chain length of acryloyl morpholine polymer 118 in the solid resin composition 101 and to limit unintended polymerization in the liquid resin composition 100 due to initiation via ambient light. By limiting the average chain length of the acryloyl morpholine polymer 118, solubility of the solid resin composition 101 can be improved. This most likely occurs due to a reduction of steric bulk in the solid resin composition 101, thereby allowing water to disassemble the acryloyl morpholine polymer 118 by hydrogen bonding with carbonyl group 114 of each acryloyl morpholine monomer in the acryloyl morpholine polymer chain 118.

The polymerization inhibitor 140 can include butylated hydroxytoluene (illustrated, for example, in FIG. 1), nitrobenzene, or diphenyl picryl hydrazyl, which are especially effective in terminating an acryloyl morpholine polymer chain 118 because they stabilize the resonance of the polymer. The polymerization inhibitor may prevent local concentration of electrons in the polymer, thus inhibiting continued polymerization of the chain. Alternatively, the liquid resin composition 100 includes polymerization inhibitors 140 such as monomethyl ether hydroquinone or other acrylic acid esters (e.g., glycerol propoxylate esterified with acrylic acid).

In one variation, the liquid resin composition 100 includes butylated hydroxytoluene (illustrated, for example, in FIG. 1). Butylated hydroxytoluene donates a proton to the acryloyl morpholine polymer shown in the termination reaction of Block S124, thereby terminating the polymer chain. Note that the byproduct of the termination reaction of Block S124 is stable due to steric hinderance of the remaining oxygen atom of the hydroxy group in butylated hydroxytoluene, and as such does not affect the toxicity of the solid resin composition 101 when dissolved in water.

In one variation, the liquid resin composition 100 includes 0.1% to 3.0% of the polymerization inhibitor 140 such that a volume of the solid resin composition 101 formed by exposing the liquid resin composition 100 to electromagnetic radiation exhibits: greater than a threshold minimum chain length of polymerized monomer that forms a rigid structure; and less than a threshold maximum chain length of polymerized monomer that enables the rigid structure to dissolve in water. In particular, by including more than 0.1% of the polymerization inhibitor 140, the liquid resin composition 100, once polymerized, can yield a solid resin composition 101 that exhibits relatively short chain length and exhibits low steric hindrance. Similarly, by including less than 1.0% of the polymerization inhibitor 140, the liquid resin composition 100, once polymerized, can yield a solid resin composition 101 that exhibits chain lengths long enough to yield a rigid structure that is capable of maintaining its geometry under mechanical stress (e.g., when subjected to elevated pressures and/or elevated temperatures, such as when injected under pressure with injection material, as described below).

Therefore, for hybrid manufacturing applications of the liquid resin composition 100, the polymerization inhibitor 140 limits the average chain length of acryloyl morpholine polymers 118 in a molding shell to increase resilience of the shell to internal pressure during injection of injection material in a molding process. In hybrid manufacturing applications, the polymerization inhibitor 140 also limits the average chain length of acryloyl morpholine polymers 118 in a molding shell to reduce steric bulk of the selective volume to increase water-solubility of the shell.

1.7 Temperature Stabilizer

The liquid resin composition 100 includes a temperature stabilizer 150, which can also function to increase the viscosity of the liquid resin. The temperature stabilizer 150 can be a polymer that may chemically or physically cross-link with the acryloyl morpholine polymer 118 or otherwise function to stabilize the solid resin composition 101 in the presence of heat. The liquid resin composition can include the temperature stabilizer 150 in monomer form or as a polymer chain. Therefore, the temperature stabilizer 150 does not, necessarily, polymerize during free radical polymerization of acryloyl morpholine 110 illustrated in Block S122. When present in the liquid resin composition 100, the temperature stabilizer 150 can be used to vary the viscosity of the liquid resin composition 100 based on the molecular weight of the temperature stabilizer 150, where a higher molecular weight results in higher viscosity and vice versa.

In one variation, the liquid resin composition 100 can include polyvinylpyrrolidone (hereinafter "PVP", as illustrated in FIG. 1). A solid resin composition 101 including PVP exhibits increased heat-deflection temperature and is soluble in water. While varying the average molecular weight of the PVP included in the liquid resin may not significantly change the temperature stabilizing properties of PVP in the solid resin composition 101, the average molecular weight of PVP can be adjusted to affect the viscosity of the liquid resin composition 100. In one variation, the liquid resin composition 100 includes PVP exhibiting an average molecular weight of between 2,500 grams per mol and 360,000 grams per mol. A liquid resin composition 100 including PVP with an average molecular weight within this range exhibits a viscosity appropriate for a variety of additive manufacturing applications.

The liquid resin composition 100 can include a range of proportions of the temperature stabilizer 150 depending on the temperature stabilizer 150 used and its effect on the viscosity of the liquid resin composition 100. The liquid resin composition 100 can include between 2.0% and 10.0% of the temperature stabilizer 150.

For hybrid manufacturing applications, the temperature stabilizer 150 increases the heat-deflection temperature of the shell to maintain rigidity of the shell during exothermic curing of the injection material. Thereby producing a more accurate molded part.

One variation of the liquid resin composition 100 includes PVP, as the temperature stabilizer 150, in a proportion of between 2% and 20%; and includes butylated hydroxytoluene, as the polymerization inhibitor 140, in a proportion between 0.1% and 3.0%.

1.8 Phases and Properties

The liquid resin composition 100 and the solid resin composition 101 are two phases of related material. The liquid resin composition 100 includes initial ingredients that, when selectively photocured, result in the solid resin composition 101 via the free radical polymerization of acryloyl morpholine of Block S122. For this reason, the components of the liquid resin composition 100 affect not only its own properties, but also the properties of a corresponding solid resin composition 101 and, by extension, any synthetic resin product manufactured from the solid resin composition 101. Additionally, the chemical composition of the two phases is different due to the reactions shown in FIG. 2. The byproducts of reactions of Blocks S121, S122, S123, and S124, including subspecies of chemical species included in the liquid resin composition 100 and recombinations of those subspecies, are included in the solid resin composition 101 after photocuring. Thus, in one variation, a synthetic resin product manufactured from the solid resin composition 101 includes: inert byproducts of the photoinitiator 120 produced by photodissociation S121 of the photoinitiator 120 into reactive subspecies; the radiation blocker 130; and inert byproducts of the polymerization inhibitor 140, produced by a stabilization reaction S124 of the polymerization inhibitor 140 with acryloyl morpholine polymer 118.

In one implementation, the liquid resin composition 100 includes proportions of acryloyl morpholine 110, BTP, alpha-pyrophthalone, butylated hydroxytoluene, and PVP to achieve a viscosity between 10 and 14 centipoise and a penetration depth of less than 100 microns for 405 nanometer light. For example, the liquid resin composition 100 can exhibit a viscosity between 10 and 14 centipoise in order: to limit local movement in a volume of the liquid resin composition 100 between a platen 310 and a projection system 322 within an apparatus 300 during selective photocuring and fabrication process, as described below; while also allowing the liquid resin composition 100 to flow globally into this volume between the platen 310 and the projection system 322 as the platen 310 is drawn away from the projection system 322 during this photocuring and fabrication process. Furthermore, by exhibiting a penetration depth of less than 100 microns, the liquid resin composition 100 can enable high vertical selectivity (e.g., layer-to-layer resolution).

In one implementation, the solid resin composition 101 photocured from a liquid resin composition 100 including acryloyl morpholine 110, BTP, alpha-pyrophthalone, butylated hydroxytoluene, and PVP, exhibits a tensile yield strength between 40 and 60 megapascals, a heat-deflection temperature between 140 and 160° C., and a rate of dissolution in water between 0.5 and 20 grams per hour.

These properties are beneficial for hybrid additive manufacturing techniques described in the following sections. A synthetic resin product manufactured from the solid resin composition 101 can be used to create a shell for molding or casting solid parts due to its high tensile yield strength and high heat-deflection temperature when compared to other photocurable resins. Its water solubility also allows for easy removal of a shell of the synthetic resin product from a finished solid part internal to the shell.

In one variation, the synthetic resin product can be a shell defining an internal volume of a part, where the shell is configured to: resist deformation during injection of an injection material under pressure into the internal volume and during exothermic hardening of the injection material within the internal volume; and dissolve in the presence of water to expose the injection material.

In another variation, the synthetic resin product manufactured from the solid resin composition 101 can be dissolved where the dissolved phase includes: inert and non-toxic subspecies of acryloyl morpholine dissolved in water; and inert and non-toxic subspecies of the thermal stabilizer dissolved in water.

In another variation, the synthetic resin product manufactured from the solid resin composition 101 is characterized by a tensile yield strength greater than 40 megapascals, a heat-deflection temperature greater than 140° C., and a rate of dissolution in water greater than 0.5 grams per hour.

2. Method

Figure 3:
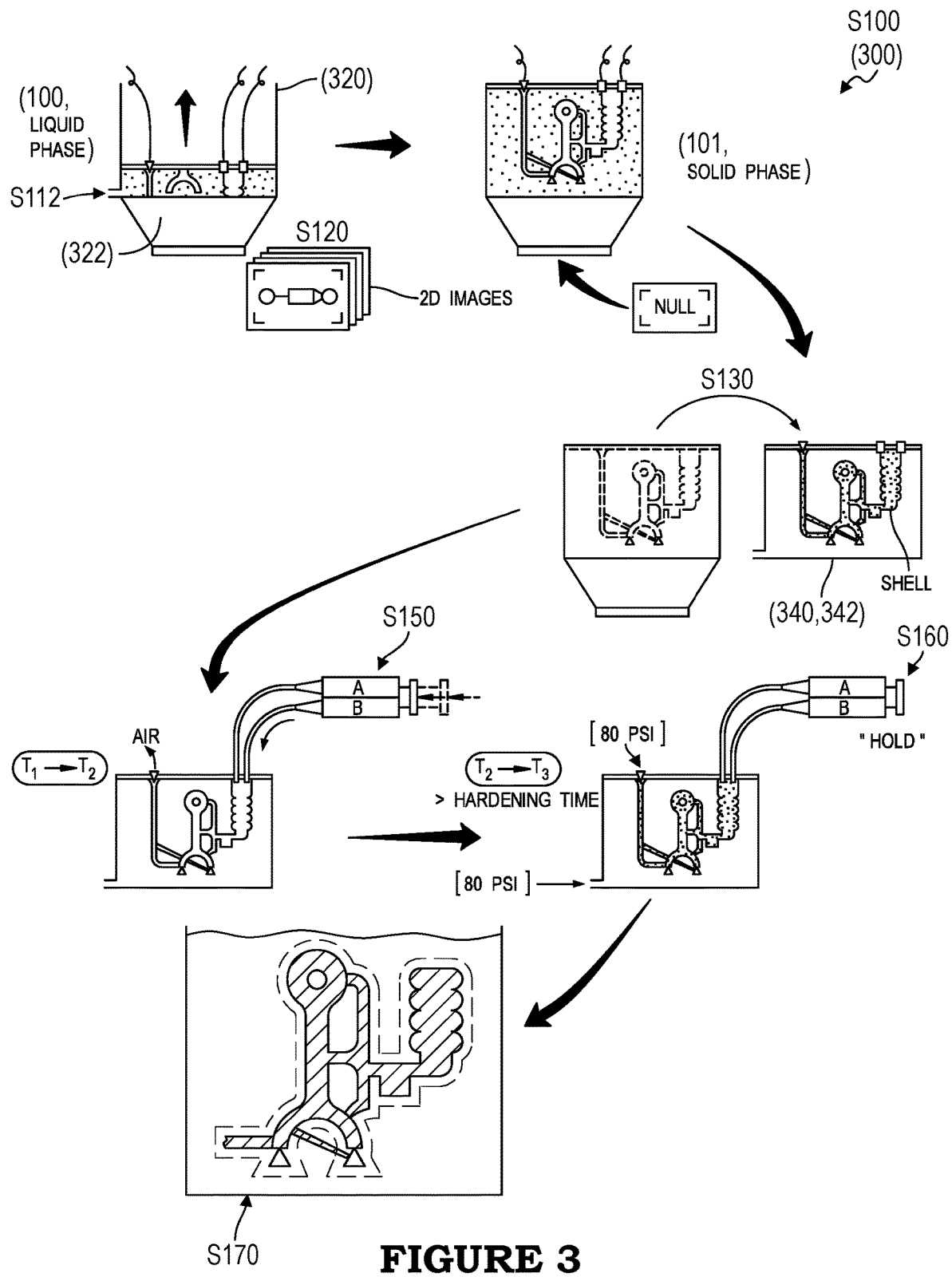
FIG. 3 is a flowchart representation of a method.

As shown in FIG. 3, a method S100 for fabricating a solid part includes: dispensing a volume of liquid resin inside a fabrication chamber 320 in Block S112, the liquid resin comprising a mixture of: a monomer, a photoinitiator configured to polymerize the monomer responsive to incident electromagnetic radiation within a spectrum, a radiation blocker configured to absorb electromagnetic radiation within the spectrum, and a polymerization inhibitor 140 configured to terminate polymerization of the monomer; in the fabrication chamber, selectively exposing subvolumes of the volume of liquid resin to electromagnetic radiation in the spectrum to selectively polymerize local volumes of the monomer into a rigid shell defining an internal volume representing a part envelope of the solid part in Block S120; injecting an injection material into the internal volume of the rigid shell in Block S150; and, in response to hardening of the injection mixture into the solid part within the interior volume of the rigid shell in Block S160, dissolving the rigid shell in water to expose the solid part in Block S170.

2.1 Method: Applications

Generally, the method S100 can be executed by the apparatus 300 or by multiple apparatuses with human transitionary steps. As such, any process described herein with respect to apparatus 300 may also be performed by another device or by multiple devices. For example, a human can move the shell from the fabrication chamber 320 to the pressure chamber 342, which can be separate apparatuses.

When utilizing apparatus 300 to fabricate a shell from a solid resin composition: suspended from a platen 310; defining an internal mold volume representing a final solid part; defining a static mixing head configured to merge and mix two discrete fluid streams inbound from two injection ports in the platen 310; defining a set of gates and runners extending from the static mixing head to the internal mold volume; and defining a set of vents extending from the internal mold volume to a pressure port 313 in the platen 310. Blocks of the method S100 can be further executed by the apparatus 300 to: inject a two-part injection material (e.g., silicone and a catalyst, ceramic and a catalyst, metal particles in a two-part resin binder, etc.); pressurize the internal mold volume via the pressure port 313 while the injection material cures in order to reduce porosity in the injection material as the injection material cures; and to pressure the exterior of the shell as the injection material cures in order to support the shell and prevent the shell from cracking under elevated pressures inside the shell.

In particular, the apparatus 300 can execute the method S100 automatically to fabricate a one-time-use thin-shell injection mold, to inject injection material into the injection mold as the injection material solidifies (e.g., cures), and to control the pressures inside and outside of the mold as the injection material cures into a final part in order to achieve low porosity (e.g., minimal air bubbles) in the final part while minimizing risk of rupturing the mold. The apparatus 300 can fabricate the one-time-use thin-shell injection mold with a water-soluble photocured synthetic resin, such as the solid resin composition described above. The apparatus 300 can therefore fabricate the one-time-use thin-shell injection mold within the fabrication chamber 320 by projecting light from the projection system 322 toward the platen 310—to selectively cure layers of a liquid resin composition according to a predefined shell geometry—as the platen 310 is drawn away from the projection system 322 and as fresh (i.e., uncured) liquid resin is introduced between the platen 310 (and cured synthetic resin suspended from the platen 310) and the projection system 322. Once all layers of the shell have been fabricated—suspended from the platen 310 to define an internal mold volume—within the fabrication chamber 320, the shell can be removed from the fabrication chamber 320. The internal mold volume can also define catches configured to catch and retain uncured liquid resin— still trapped in the shell following a flush cycle but flowing down to low points in the internal mold volume—outside of a part envelope defined by the internal volume of the shell.

In addition to a part envelope for a final part formed by material injected into the shell, the shell can also define: a static mixing head fluidly coupled to the two discrete injection ports in the platen 310; all gates and runners fluidly coupling the static mixing head to the part envelope; and all vents fluidly coupling the part envelope to the pressure port 313 in the platen 310. During a mold cycle, the apparatus 300 can inject separate reactive components of a two-part injection material into the mold via the first and second injection ports 312; the static mixing head—which is integral to the shell—can fully mix these components of the injection material before the injection material flows to, fills, and cures inside the part envelope defined by the shell. Therefore, substantially all mixed (e.g., cured and semi-cured) injection material dispensed by the apparatus 300 during a mold cycle can be contained within the mold itself, thereby simplifying cleanup, simplifying transition between different injection materials, and limiting material waste. By also pressurizing the interior of the shell, the apparatus 300 can suppress porosity in the injection material while the injection material cures inside the shell; by pressurizing the volume outside and around the shell as the injection material cures, the apparatus 300 can limit a pressure gradient across walls of the shell, thereby limiting deformation of the shell and reducing likelihood of rupture of the shell under elevated internal pressures without necessitating greater wall thickness of the shell, which may otherwise require extended fabrication time and yield greater material waste.

Furthermore, because the solid resin composition is water soluble once cured, removal of the synthetic resin product from the platen 310 can be completed by immersing the platen 310, mold, and solid part—contained inside the mold—into a water bath 360. Furthermore, because the solid part is connected to the platen 310 via the shell, dissolution of the solid resin composition in water can also serve to cleanly separate the solid part from the platen 310. Solubility of the solid resin composition in water—a non-toxic and accessible fluid—can therefore simplify extraction of the solid from the one-time-use thin-shell injection mold upon completion of the mold cycle without sacrificing dimensional stability or detail of the internal mold volume during injection of the injection material during the mold cycle.

Note that, for ease of explanation in the following sections, the liquid resin composition described above may be referred to simply as a "liquid resin." Likewise, the solid resin composition may be referred to as "synthetic resin." Despite the differences in terminology, the shell is generally comprised of the solid resin composition 101 described above, photocured from the liquid resin composition 100 also described above.

2.2. Virtual 3D Shell Geometry

In one variation, the method S100 includes generating a 3D shell geometry defining the part envelope, resin catches coupled to the part envelope, a static mixing head aligned to injection ports in the platen 310, gates and runners extending between the static mixing head and the part envelope, and vents running from the part envelope to the pressure port 313 in the platen 310. Once the 3D shell geometry is calculated, such as by a computing device (e.g., a local computer or remote computer network), the apparatus 300 can execute Blocks of the method S100 to fabricate the 3D shell geometry inside the fabrication chamber 320 in preparation for injecting the corresponding shell with a selected injection material.

Figure 4:
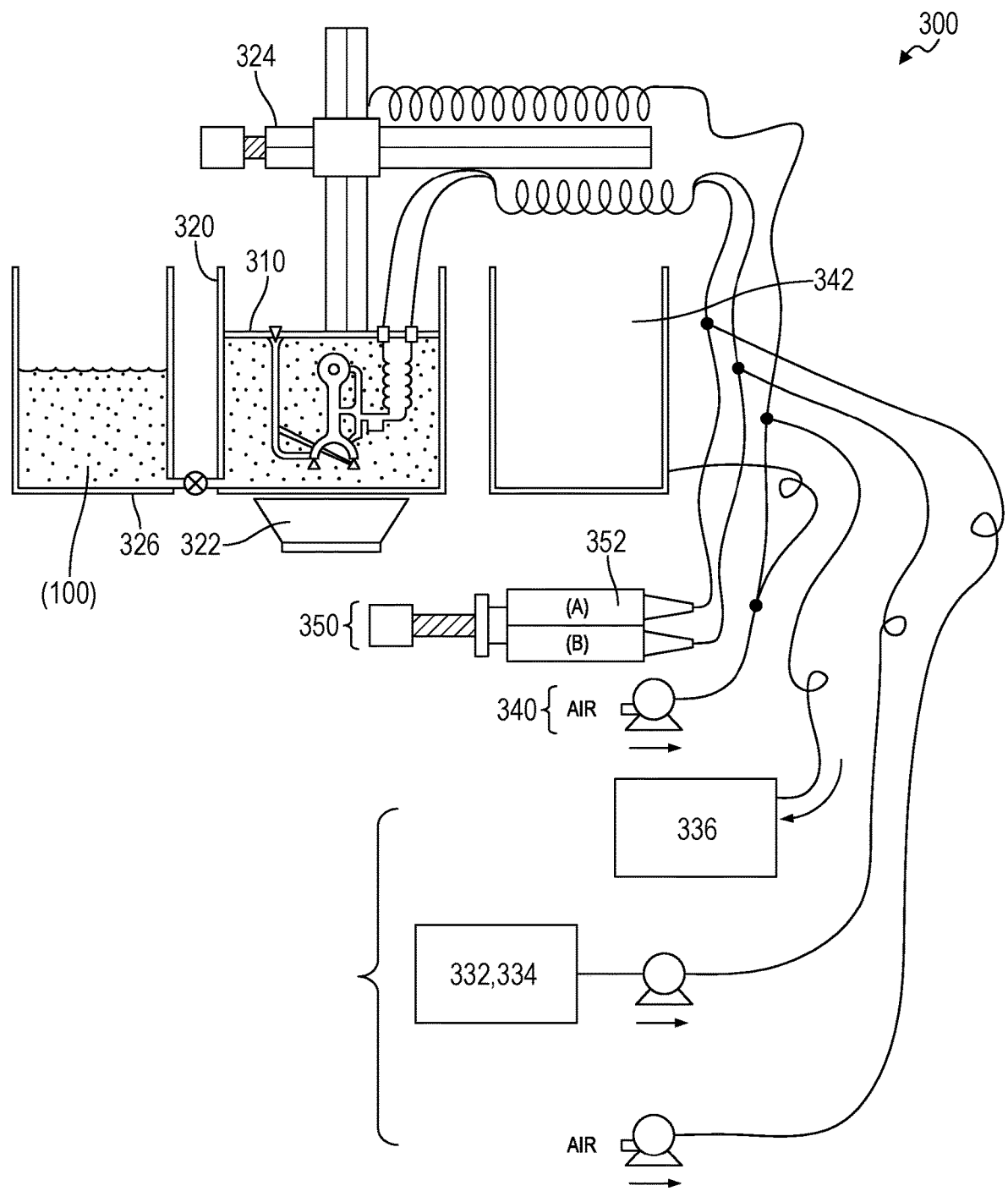
FIG. 4 is a schematic representation of an apparatus.

In one implementation, a computer system accesses a 3D part model of a final part, such as through a web browser or native application executing on a computing device or from a remote server or database. The computer system then orients the 3D part model relative to a virtual representation of the platen 310 (e.g., a "virtual platen 310") within a virtual environment, such as offset slightly below and centered between injection and pressure ports 313 represented by the virtual platen 310 with a minimum number of convex surfaces facing downward and away from the virtual platen 310. The computer system can also: segment the 3D part model into multiple regions, wherein each region contains a single convex surface facing downward and away from the virtual platen 310, which may represent a low point in the one-time use injection mold created according to the resulting virtual 3D shell geometry; and add one virtual drain catch volume to the lowest point on each segment of the 3D part model, as shown in FIG. 4. For example, each virtual drain catch volume can represent a virtual rectilinear volume that intersects the low point in the 3D part model (i.e., a region furthest from the virtual platen 310); when represented as negative space by the shell, the resulting catch may collect uncured liquid resin trapped inside the shell that naturally flows downward into the catch due to low viscosity of the uncured liquid resin. In particular, a small volume of uncured liquid resin may remain in the shell following removal of the shell from the fabrication chamber 320; the catches can thus collect and retain uncured liquid resin outside of the part envelope as injection material is injected into the shell during a subsequent injection cycle. In this example, for each virtual drain catch, the computer system can: implement a preset virtual drain catch volume; calculate the volume of the virtual drain catch based on (e.g., proportional to) the surface area of the corresponding segment of the 3D part model; or based on the volume of a corresponding segment of the 3D part model. Furthermore, in this example, the computer system can calculate a volume of each virtual drain catch such that a virtual drain catch is sufficiently large to both 1) collect all trapped uncured liquid resin within the corresponding segment of the 3D part model and 2) function as a riser that fills with injection material during an injection cycle and permits injection material to move back into and fill the part envelope as the injection material shrinks while curing.

Once the 3D part model is oriented relative to the virtual platen 310 and virtual drain catches are appended to low points on the 3D part model, the computer system can add virtual flow pathways extending from virtual injection ports represented by the virtual platen 310, to the 3D part volume, and terminating at the virtual pressure port 313 represented by the virtual platen 310. For example, the computer system can: retrieve a predefined static mixing head model, such as representing a generic static mixing head or representing a custom static mixing head model associated with the injection material selected for the final part represented by the 3D part model; insert the predefined static mixing head model into the virtual environment; and align two discrete virtual inlet ports of the static mixing head model with the virtual injection ports of the virtual platen 310, as shown in FIG. 4. In this example, the computer system can then: calculate lengths and cross-sections of gates, runners, and vents that achieve limit pressures inside the shell during an injection cycle to below a threshold pressure while also achieving at least a minimum dwell time for an injection material selected for the final part represented by the 3D part model based on a known (static or time-dependent) viscosity and known cure time of the injection material; and populate the virtual environment with virtual gates and runners that connect the static mixing head model to the 3D part model based on these length and cross-section parameters, such as by connect gates to sides or tops of segments in the 3D part model. The computer system can similarly populate the virtual environment with virtual vents that connect the 3D part model to the virtual pressure port 313 on the virtual platen 310, such as by adding virtual vents that intersect the 3D part model near the bottom of each segment (e.g., opposite corresponding gates) in the 3D part model in order to wash solvent out of the internal volume of the shell via these vents, as shown in FIG. 3.

In one variation, the computer system can also locate a virtual premix reservoir (or "resin catch") between the outlet of the static mixing head model and runners extending toward the 3D part model, as shown in FIG. 4. When realized by the apparatus 300 when fabricating the shell, the premix reservoir can fill with an initial volume of mixed injection material exiting the static mixing head model; once the premix reservoir is filled, additional injection material mixed by and passing through the static mixing head moves into the runners and gates, then into the part envelope defined by the shell, and then into the vents to completely fill the mold. In particular, the premix reservoir can collect and retain an initial volume of mixed injection material exiting the static mixing head in order to avoid introducing this initial volume of injection material—which may exhibit poor mixing, inconsistent composition, or improper ratio of resin components—into the part envelope. The computer system can thus insert a virtual premix reservoir of generic or custom geometry into the virtual environment. For example, the computer system can: calculate a target volume of the premix reservoir based on known mixing characteristics, a known viscosity of the injection material, and a target dwell time assigned to the injection material; and than scale a generic virtual premix reservoir to this target volume.

The computer system can thus extend the 3D model of the part to include virtual representations of the flow pathway, including a virtual representation of a static mixing head, gates, runners, vents, and/or a premix reservoir. The computer system can then generate a virtual 3D volume containing and offset from virtual surfaces of the 3D part model, such as according to a uniform offset distance equal to a preset shell thickness assigned to the injection material specified for the final part. Alternatively, the computer system can calculate target shell wall thicknesses along the 3D model of the part based on a known viscosity of the injection material and lengths and geometries of the static mixing head, gates, runners, vents, and final part represented by the 3D part model, etc. For example, the computer system can estimate pressure drops over discreet regions of the 3D part model from the injection port to the pressure port 313 based on the foregoing parameters and then assign a shell thickness to each region of the 3D part model proportional to corresponding pressure drop values. In this example, the computer system can then generate the virtual 3D volume containing and offset from virtual surfaces of the 3D part model by offset distances corresponding to these varying shell thicknesses.

The computer system can then subtract the 3D part model from the virtual 3D volume to generate a virtual 3D shell geometry. The computer system can also add support structures to the exterior of the virtual 3D shell geometry to support the virtual 3D shell geometry below the virtual platen 310, such as by adding longitudinal and circumferential ribs along junctions between gates and regions of the shell defining the part envelope, between gates and runners, and/or between runners and the mixing head, etc. The computer system can also: segment (or "slice") the virtual 3D shell geometry into a sequence of virtual layers parallel to the virtual platen 310; and represent each virtual layer as a 2D image associated with a discrete height of the shell and that, when projected onto liquid resin in the fabrication chamber 320 by the projection system 322, selectively cures a thin layer of the liquid resin in the form of the virtual layer from the virtual 3D shell geometry, as shown in FIG. 3.

2.3. Mixing Head Variations

Therefore, the computer system can incorporate a static mixed head into the virtual 3D shell geometry such that a shell—later printed by the apparatus 300 according to the virtual 3D shell geometry—defines a physical static mixing head through which two separate components of the injection material can be pumped to fully mix these components, thereby catalyzing the injection material that then hardens inside the shell to create a physical object representing the original 3D part model. In particular, the shell—once fabricated—can define a static mixing head arranged over and fluidly coupled to injection ports on the platen 310. The static mixing head can be coupled to canisters 352 containing separate components of the designated injection material via hoses coupled to the injection ports such that injection material enters the shell in unmixed components and is mixed only inside of the shell as it passes through the static mixing head segment of the shell, thereby: limiting a distance from the static mixing head to the part envelope defined by the shell, which reduces waste; ensuring that all cured injection material is fully contained inside the shell prior to dissolution of the shell, which eases cleanup; and simplifying detachment and reattachment of the same injection material canisters 352 to the platen 310 in preparation for a next part cycle in which a new shell is fabricated and injected with the injection material.

Alternatively: the platen 310 can include a single injection port configured to interface with an external prefabricated static mixing head; and the computer system can implement the foregoing methods and techniques to generate a virtual 3D shell geometry that includes a single runner extending from the single injection port. For example, a single injection port in the platen 310 can be threaded to accept a threaded output at the end of a prefabricated static mixing head; or the single injection port can include a smooth bore configured to accept an elastomeric stopper 314 coupled to a single hose extending from an outlet of a remote static mixing head (e.g., integrated into an injection material canister loaded into the injection system 350).

2.4. System Preparation for New Part Cycle

To prepare the apparatus 300 for a new part cycle, a sequence of 2D images—generated as described above based on a virtual 3D shell geometry representing a final part—is loaded onto the apparatus 300 (or loaded onto a machine nearby that drip-feeds these 3D images into the apparatus 300). A cartridge system containing separate parts of a specified injection material is shaken (e.g., in a "paint mixer") to achieve uniform distribution of their contents (e.g., metal particles), is loaded into the injection system 350, and is connected to the injection ports on the platen 310 with separate supply lines (e.g., "hoses"). For example, the cartridge system: can define two separate cylinders, each containing one of two parts of the injection material and terminating at a nozzle; can include one piston sealed inside of each cylinder; and can include one discrete supply line extending from the nozzle and configured to mate inside a polymeric (e.g., rubber) stopper 314, which is then transiently installed in one of the two injection ports on the platen 310 to fluidly couple the cylinder to a shell that is later fabricated on the bottom of the platen 310. In this example, the injection system 350 can include a linear actuator configured to drive pistons in the cylinders forward to displace injection material components out of each cylinder, through the nozzles, and toward the platen 310 via the supply lines. As described below and shown in FIG. 5, supply lines coupling the cartridge system to the platen 310 can also include tees—with check valves—that couple the injection ports to separate solvent and air supplies.

Thus, in preparation for a new part cycle, each supply line from the cartridge system can be connected to a polymeric stopper 314, and these polymeric stoppers 314 can be pressed into or clamped over corresponding injection ports in the platen 310. Similarly, a third polymeric stopper 314 can be connected to the pressure system 340 and then pressed into or clamped over the pressure port 313. These stoppers 314 can thus function to seal the injection and pressure systems 340 to the platen 310 to prevent liquid resin from leaking past the injection and pressure ports 313 to the top side of the platen 310 during a fabrication cycle.

2.5 Shell Fabrication According to Virtual 3D Shell Geometry

With the apparatus 300 thus prepared for the new part cycle, the linear motion system 324 can locate the platen 310 (e.g., a flat steel or aluminum plate) over the fabrication chamber 320 and lower the platen 310 toward the bottom of the fabrication chamber 320. The bottom of the fabrication chamber 320 can be substantially transparent to a wavelength of electromagnetic radiation (e.g., UV light) that dissociates the (primary) photoinitiator in the liquid resin composition; and the projection system 322 can be arranged in the bottom of the machine, can face the platen 310 through the transparent bottom of the fabrication chamber 320, and can be configured to project UV light in the form of 2D images toward the platen 310 to activate photoinitiator at a target distance offset above the bottom of the fabrication chamber 320.

With the platen 310 lowered, the reservoir can release or dispense liquid resin composition into the fabrication chamber 320, such as by actively pumping liquid resin into the fabrication chamber 320 or by passively releasing the liquid resin composition into the fabrication chamber 320 as the retraction of the platen 310 from the bottom of the fabrication chamber 320—by the linear motion system 324—draws the liquid resin composition from the reservoir into the fabrication chamber 320. The projection system 322 can then project a first 2D image—generated by the computer system as described above and representing a topmost layer of the shell—toward the bottom face of the platen 310 to selectively cure the liquid resin composition onto the bottom face of the platen 310. The linear motion system 324 can then index the platen 310 up to the next layer position (i.e., offset above its initial position by a layer thickness implemented by the computer system to generate the sequence of 2D images); the reservoir can release additional liquid resin composition into the fabrication chamber 320 to fill a void between the transparent bottom of the fabrication chamber 320 and the new layer of cured solid resin composition extending below the bottom of the platen 310 as the platen 310 rises in the fabrication chamber 320; and the projecting system can project a second 2D image—in the sequence of 2D images representing the shell—toward the platen 310 to cure a next layer of liquid resin composition in the form of a corresponding slice of the virtual 3D shell geometry represented by this second 2D image. The apparatus 300 can repeat this process until a final 2D image—in the sequence of 2D images—is output by the projection system 322 to complete the fabrication of the shell, which is still immersed in uncured liquid resin composition, as shown in FIG. 4.

2.6 Shell Preparation for Injection

Once the liquid resin composition has been selectively cured to form the shell—suspended from the bottom of the platen 310—according to the 3D shell geometry defined by the computer system, the linear motion system 324 can: retract the platen 310 and the shell from the fabrication chamber 320: move the platen 310 horizontally into position over the pressure chamber 342; and drive the platen 310 down into contact with the pressure chamber 342, such as to seal the bottom face of the platen 310 against the top edge of the pressure chamber 342 or to seal the perimeter of the platen 310 against the interior wall of the pressure chamber 342, as shown in FIG. 4. Alternatively, a user may manually move the shell from the fabrication chamber to the pressure chamber and may manually remove the shell from the platen and attach the shell to injections ports not located in the same platen but in a different apparatus that can perform the steps in Block S150.

In some variants of the method, a thin layer of uncured liquid resin composition can be present on the internal surface of the shell, left over from the fabrication process. This layer can improve temperature stability of the shell by insulating the shell from exothermic injection material. Additionally, the layer can facilitate removal of the shell from a hardened part defined by the internal volume of that shell. The thickness of the thin insulation layer of liquid resin composition can be adjusted by adjusting the viscosity of the liquid resin. A higher viscosity may result in a thicker insulating layer, while a lower viscosity may result in a thinner insulating layer. In alternative variations, additional liquid resin can be flushed out of the shell to ensure contact between the shell and the injection material.

2.7 Rinse Cycle

Once the liquid resin composition has been selectively cured to form the shell—suspended from the bottom of the platen 310—according to the 3D shell geometry defined by the computer system, the linear motion system 324 can: retract the platen 310 and the shell from the fabrication chamber 320: move the platen 310 horizontally into position over the pressure chamber 342; and drive the platen 310 down into contact with the pressure chamber 342, such as to seal the bottom face of the platen 310 against the top edge of the pressure chamber 342 or to seal the perimeter of the platen 310 against the interior wall of the pressure chamber 342, as shown in FIG. 4.

Figure 5:
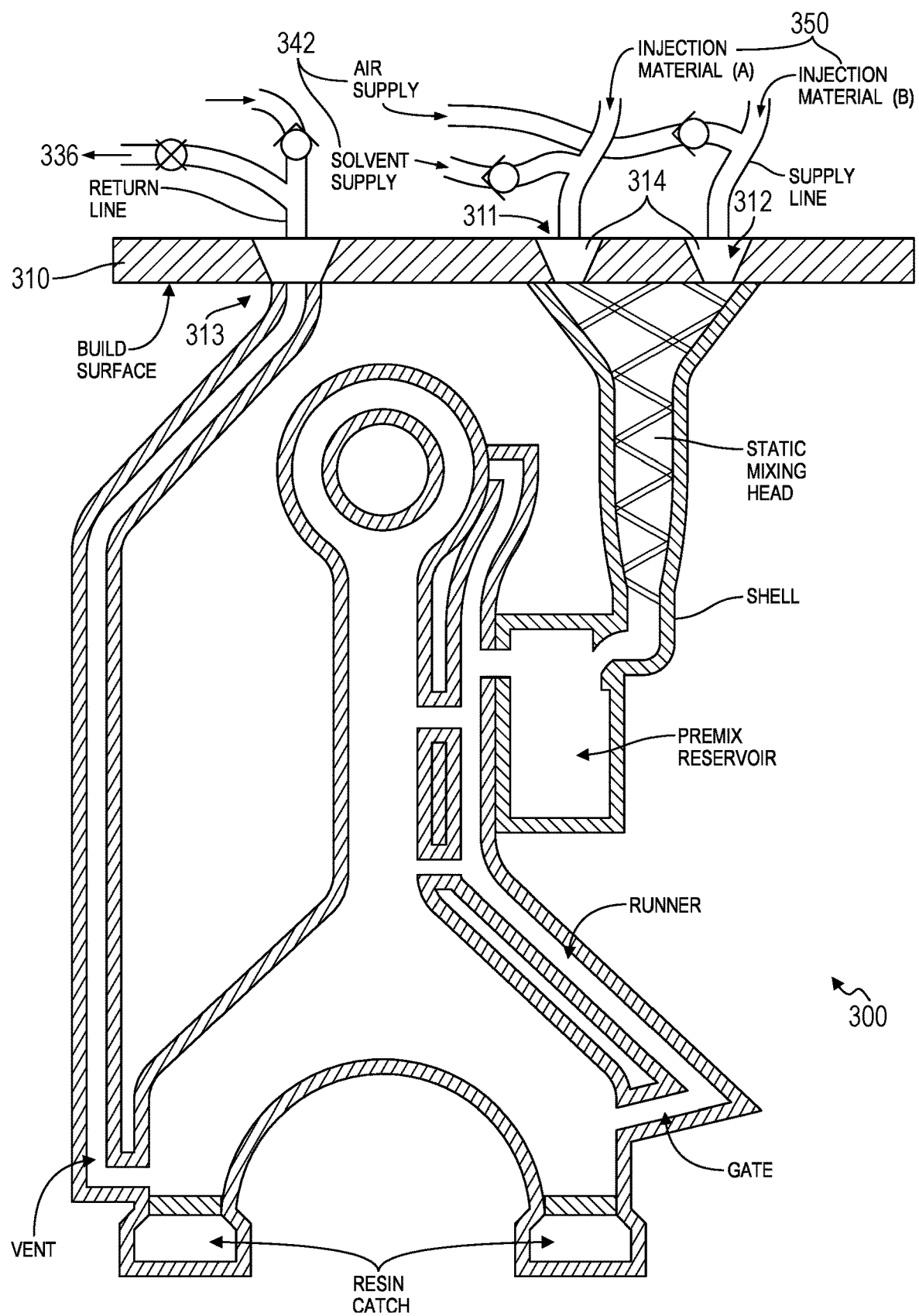
FIG. 5 is a schematic representation of one variation of the apparatus.

After (or before) the linear motion system 324 seals the platen 310 against the pressure chamber 342, the wash system 330 can flush uncured liquid resin composition from the interior volume of the shell. In one implementation, the wash system 330 fluidly couples a tee and a supply line at one or both injection ports to a solvent supply 332; and the pressure system 340 fluidly couples a return line extending from the outlet port on the platen 310 to a waste reservoir 336, such as by selectively activating a set of valves between the waste reservoir 336 and the return line, as shown in FIG. 5. The wash system 330 then pumps solvent into the interior volume of shell—via the injection ports—and evacuates alcohol and uncured liquid resin composition from the interior volume of the shell via the return line, as shown in FIG. 4. For example, the solvent can include dry (i.e., 99.9% water-free) isopropyl alcohol, which may displace uncured solvent out of the shell via the pressure port 313 and which may dry relatively quickly inside the shell without dissolving cured solid resin composition that defines the shell.

As described above, a first supply line from the injection system 350 to a first injection port 311 in the platen 310 can also include a first tap between the injection system 350 and the first injection port 311; the wash system 330 can fluidly couple to the first tap via a one-way (or "check") valve in order to supply solvent and later a gas to the shell during a flush cycle while also preventing backflow of uncured liquid resin composition, solvent, or injection material toward the wash system 330 during the part cycle generally. The second supply line can similarly include a tap and check valve coupled to the same wash system 330.

To flush the interior volume of the shell, the wash system 330 can pump solvent into the shell over a preset duration or pump a target volume of solvent through the shell, such as proportional to (e.g., twice) a total volume of the interior cavity of the shell. Alternatively, the wash system 330 can include an optical detector arranged across the return line; and the wash system 330 can sample the optical detector to monitor the clarity or color of fluid exiting the shell via the return line as solvent is pumped through the shell and cease this flush cycle only once fluid exiting the shell exhibits at least a threshold clarity or exhibits less than a threshold change in clarity per unit volume of solvent displaced into the shell, at which time the wash system 330 can cease active displacement of solvent through the shell.

Once the solvent wash is complete, the wash system 330 can fluidly couple the supply lines to a gas supply and then pump gas (e.g., air or inert gas) through the supply lines to draw remaining solvent out of shell. (Alternatively, the wash system 330 can fluidly couple the supply lines to ambient, and the pressure system 340 can draw a vacuum on the pressure port 313 to draw air into the shell to displace solvent into the waste reservoir 336. Yet alternatively, the first supply line can be fluidly coupled to the solvent reservoir 334 of the wash system 330, the second supply line can be fluidly coupled to the gas supply, and the apparatus 300 can selectively activate the wash system 330 and the air supply to selectively pump solvent and gas, respectively, into the shell.) Once a (significant) proportion of remaining solvent is displaced out of the shell and/or evaporated from the shell, the apparatus 300 can cease the flush cycle and execute an injection cycle to fill the shell with injection material.

The above description provides an example of an apparatus and method for performing a rinse cycle for a shell made from the solid resin composition 101. In one variation of the method, some of the processes described may be performed by a human operator as opposed to the apparatus 300. For example, functions performed by the linear motion system 324 may be replaced by similar step where a human operator moves the shell into the pressure chamber 342 and manually connects the shell to the appropriate ports.

2.8 Injection Cycle

During the injection cycle, the apparatus 300 drives the injection system 350 forward to displace both components of the injection material out of the canisters 352, through the supply lines, and the shell via the injection ports in the platen 310, as shown in FIGS. 1 and 3. The two components of the injection material mix as they are displaced under pressure through the static mixing head and then enter the premix reservoir succeeding the static mixing head; once the premix reservoir is filled, additional mixed injection material exiting the static mixing reservoir can move through the runners and gates into the part envelope and then into the vents once the part envelope is filled by mixed injection material.

The injection material can also be premixed before injection into the shell. In this variant, the premix reservoir and would instead be incorporated into the supply lines. Additionally, the injection ports can be replaced with a single injection port, which can inject the premixed injection material into the shell During the injection cycle, the apparatus 300 can advance the injection system 350 at a target injection speed (or target injection flow rate) based on: lengths and geometries of the static mixing head, gates, and runners defined by the shell; a target dwell time assigned to the injection material; and the known viscosity of the injection material, which may be time-dependent based on a cure rate of the injection material. The apparatus 300 can also monitor a torque output of the injection system 350 to maintain the target injection speed, correlate this torque with a fluid pressure inside the shell, and adjust the speed of the injection system 350 to maintain fluid pressure inside the shell below a threshold fluid pressure. (Alternatively, the apparatus 300 can sample a pressure sensor coupled to one or more supply lines to monitor fluid pressure in the shell.)

The apparatus 300 can then cease driving the injection system 350 forward once a displaced volume of injection material meets (or slightly exceeds) a known interior volume of the shell, such as accounting for expansion or shrinkage of the injection material during cure, and accounting for a swept volume of the supply lines less a proportion of the volume of vents in the shell in order to prevent displacement of mixed injection material through the pressure port 313, which may otherwise negative ease of removal of the final part from the platen 310.

2.9 Gelling Process and Porosity Suppression

Once the shell is filled with injection material following conclusion of the injection cycle, the pressure system 340 can pressurize both the interior of the pressure chamber 342—outside of the shell—and the interior of the shell in order to suppress porosity in the mixed injection material as the injection material cures inside the shell, as shown in FIG. 3.

In one example, the pressure system 340 pumps a gas (e.g., air or an inert gas, such as argon) into the shell—via the return line and the pressure port 313—up to a target pressure (e.g., 80 psi). As pressure inside the shell is increased, the pressure system 340 can also drive the injection system 350 forward slightly to achieve and maintain this same target pressure at the injection port such that fluid pressure across the injection material within the shell is substantially uniform and such that backflow of mixed injection material through the static mixing head toward the injection ports is limited. In particular, by maintaining the fluid pressure inside the shell—currently filled with injection material—at or near the elevated target pressure, gas pockets (e.g., "air bubbles") entrapped in the mixed injection material may shrink to a point at which they are no longer visible.

However, such elevated pressures inside the shell may induce stress in the walls of the shell that may lead to shell failure prior to complete gelling of the mixed injection material. Therefore, the pressure system 340 can also pump air or other gas into the pressure chamber 342 up to the target pressure, thereby limiting a pressure differential across the shell wall, reducing hoop stress on the shell, and thus supporting the shell against fracture due to elevated fluid pressures inside the shell. For example, the pressure system 340 can fluidly couple the return line—coupled to the pressure port 313 on the platen 310—to the interior volume of the pressure chamber 342 and then pump air into the return line to pressure the interior volume of the shell and the pressure chamber 342 equally as the mixed injection material cures inside the shell.

The pressure system 340 can hold the interior and exterior of the shell at this elevated pressure for at least a minimum duration corresponding to a known or estimated gel time of the injection material once mixed in order to prevent gas pockets trapped within the injection material from expanding once this elevated pressure is released.

However, once the mixed injection material has gelled sufficiently (e.g., the gel time has passed since the injection cycle was completed, plus a time safety factor), the pressure system 340 can release pressure on the interior of the shell and the pressure chamber 342. The linear motion system 324 can then elevate the platen 310—including the shell filled with injection material suspended from the platen 310—out of the pressure chamber 342 in preparation for removal of the shell.

2.10 Shell Removal

In one variation shown in FIG. 3, the apparatus 300 further: includes a water tank 360, such as including a heating element and an ultrasonic transducer (or other agitation mechanism 362) configured to heat and agitate water contained in the water tank 360, respectively, as shown in FIG. 4. For example, the fabrication chamber 320, pressure chamber 342, and water tank 360 can be adjacent one another and arranged in a linear or radial pattern inside the apparatus 300. In this variation, the apparatus 300 can also include a skimmer configured to remove dissolved synthetic resin from the water tank 360, such as following a shell removal cycle. Alternatively, the water tank 360 can be a separate apparatus into which the user can manually transport the shell.

In one implementation, the apparatus 300 preheats water in the water tank 360, such as during fabrication of the shell and/or during the injection cycle. Once the injection cycle is complete and the mixed injection material has gelled, the linear motion system 324 or user withdraws the platen 310 out of the pressure chamber 342, moves the platen 310 laterally into position over the water tank 360, and then submerges the platen 310—with the shell and injection material suspended from below—into the water tank 360. Because the cured synthetic resin is water soluble, as described above, the heated water in the water tank 360 can dissolve the cured synthetic resin while the transducer agitates water around the shell, thereby improving a rate of dissolution of the synthetic resin into the water in the water tank 360.

The linear motion system 324 or a user can maintain the platen 310 submerged in the water tank 360 for a period of time sufficient to fully dissolve all cured synthetic resin from the platen 310 in preparation for a next part cycle. For example, the apparatus 300 can calculate a submerse time proportional to a maximum wall thickness of the shell. The linear motion system 324 can then remove the platen 310 from the water tank 360 and return the platen 310 to the fabrication chamber 320 in preparation for a next part cycle once this submerse time has passed or once a load on the linear motion system 324 indicates that a mass (i.e., the final part) has disconnected and dropped from the bottom face of the platen 310. In particular, once the shell is fully or sufficiently dissolved, the gelled injection material—now defining a solid part including gates, runners, etc.—may detach from the platen 310 and fall to the bottom of the water tank 360. With the platen 310 removed from the water tank 360, a user may manually remove the part from the bath, such as with tongs. Alternatively, the water tank 360 can be loaded with a wire basket, and the user can manually lift the wire basket out of the water tank 360 to retrieve the solid part. Yet alternatively, the linear motion system 324 can automatically elevate the wire basket out of the water bath 360 to present the solid part to a user for inspection and additional processing.

Alternatively, once the injection material is fully or sufficiently gelled and the linear motion system 324 retracts the platen 310 from the pressure chamber 342, a user can manually retrieve the platen 310 and immerse the platen 310 and shell in an external water bath 360 to dissolve the shell away from the part.

However, the apparatus 300 can include any other elements and function in any other way to automatically dissolve the shell from the solid part inside or to support a user in manually processing the platen 310 to remove the shell from the solid part inside.

2.10 Post Processing

The solid part can then be post-processed, such as by manually trimming gates, runners, catches, etc. from the solid part, as shown in FIG. 4. For the injection material that includes metal particles suspended in a resin, the resin can be burned out of the solid part to leave (substantially) only metal particles, and these remaining metal particles can then be sintered into a final near-full-density (e.g., ~100% dense) metal part.

As a person skilled in the art will recognize from the previous detailed description and from the figures and claims, modifications and changes can be made to the embodiments of the invention without departing from the scope of this invention as defined in the following claims.

We claim:
1. A liquid resin composition comprising:
a first proportion of acryloyl morpholine monomers;
a second proportion of a photoinitiator exhibiting photodissociation into reactive subspecies responsive to selective exposure to radiation within a spectrum, the reactive subspecies polymerizing the first proportion of acryloyl morpholine monomers into selective subvol- umes forming a rigid shell that is injectable with an injection material and water-soluble;

a third proportion of a radiation blocker absorbing radiation within the spectrum to limit penetration depth of incident radiation within the spectrum in the liquid resin;

a fourth proportion of a polymerization inhibitor limiting an average chain length of acryloyl morpholine polymer polymerized from the first proportion of acryloyl morpholine monomers; and a fifth proportion of a temperature-stabilizer increasing the heat-deflection temperature of acryloyl morpholine polymer polymerized from the first proportion of acryloyl morpholine monomers.

2. The liquid resin composition of claim 1, wherein the temperature stabilizer increases the heat-deflection temperature of the shell to maintain rigidity of the shell during exothermic curing of the injection material.

3. The liquid resin composition of claim 1, wherein the polymerization inhibitor limits an average chain length of acryloyl morpholine polymers in the shell to increase resilience of the shell to internal pressure during injection of the injection material.

4. The liquid resin composition of claim 1, wherein the polymerization inhibitor limits an average chain length of acryloyl morpholine polymers in the shell to reduce steric bulk of the selective volume to increase water-solubility of the shell.

5. The liquid resin composition of claim 1, wherein the photoinitiator comprises bis(2,4,6-trimethylbenzoyl)-phenylphosphineoxide and the second proportion is between 0.1% and 5%.

6. The liquid resin composition of claim 1, wherein:

the polymerization inhibitor comprises butylated hydroxytoluene;

the fourth proportion is between 0.1% and 3%;

the temperature stabilizer comprises polyvinylpyrrolidone; and the fifth proportion is between 2% and 20%.

7. The liquid resin composition of claim 6, wherein the polyvinylpyrrolidone exhibits an average molecular weight of between 2,500 grams per mol and 360,000 grams per mol.

8. The liquid resin composition of claim 1, wherein:

the radiation blocker absorbs radiation within the spectrum comprising wavelength between 405 nanometers and 450 nanometers; and the third proportion of the radiation blocker limits the penetration depth of incident radiation within the spectrum to less than 0.15 millimeters in the liquid resin.

* * * * *